(12) United States Patent
Shahramian et al.

(10) Patent No.: US 11,942,977 B2
(45) Date of Patent: Mar. 26, 2024

(54) SYSTEM AND METHOD FOR CONTINUOUS SAMPLER CALIBRATION

(71) Applicants: Shayan Shahramian, Richmond Hill (CA); Ryan Douglas Bespalko, Toronto (CA)

(72) Inventors: Shayan Shahramian, Richmond Hill (CA); Ryan Douglas Bespalko, Toronto (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 17/205,842

(22) Filed: Mar. 18, 2021

(65) Prior Publication Data

US 2022/0302942 A1    Sep. 22, 2022

(51) Int. Cl.
*H04B 1/16*    (2006.01)

(52) U.S. Cl.
CPC .................. *H04B 1/1607* (2013.01)

(58) Field of Classification Search
CPC .................................................... H04B 1/1607
See application file for complete search history.

(56) References Cited

U.S. PATENT DOCUMENTS

| | | | |
|---|---|---|---|
| 8,074,126 B1 | 12/2011 | Qian et al. | |
| 10,574,487 B1 * | 2/2020 | Hormati | ............ H04L 25/03076 |
| 2018/0351769 A1 | 12/2018 | Tajalli et al. | |
| 2019/0207740 A1 | 7/2019 | Graumann | |
| 2020/0007379 A1 | 1/2020 | Patil et al. | |

FOREIGN PATENT DOCUMENTS

WO    2020209937 A1    10/2020

OTHER PUBLICATIONS

PCT/CN2022/080611. "(ISA/210) International Search Report." WIPO Patentscope. Sep. 9, 2022. online. https://patentscope.wipo.int/search/docs2/pct/WO2022194083/pdf/rP719sMiQlpdvL6_8rlRUe32rTQd0ATmHSaZ6Df1irU (Year: 2022).*
PCT/CN2022/080611. "(ISA/237) Written Opinion of the International Searching Authority" WIPO Patentscope. Sep. 9, 2022. online. https://patentscope.wipo.int/search/docs2/pct/WO2022194083/pdf/4mibMBqMO74l85h0Obap_b377K3sB2dZUrslhhO4D7o. (Year: 2022).*

* cited by examiner

*Primary Examiner* — Nader Bolourchi

(57) ABSTRACT

Methods and apparatuses for calibrating voltage offset of receiver data samplers in mission mode are described. The operating conditions, including the sampling threshold, of a first sampler are matched with those of a second sampler by adjusting the voltage offset of the second sampler. The voltage offset of the first sampler is adjusted in a first voltage direction until an error rate between the two samplers meets a threshold error value at a first threshold voltage offset value. The voltage offset of the first sampler is further adjusted in a second voltage direction, opposite of the first voltage direction, until the error rate between the two samplers meets the threshold error value at a second threshold voltage offset value. The voltage offset of the first sampler is adjusted to be an average value between the first threshold voltage offset value and the second threshold voltage offset value.

15 Claims, 9 Drawing Sheets

SYSTEM AND METHOD FOR CONTINUOUS SAMPLER CALIBRATION

TECHNICAL FIELD

The present disclosure is related to data communication, and in particular to methods and systems for continuously calibrating receiver sampler voltage offset.

BACKGROUND

In some data communication systems, high-speed serializer/de-serializer (SerDes) circuits are used to transmit data between chips or components. SerDes circuits typically include a pair of functional blocks, such as a SerDes transmitter and a SerDes receiver, that convert data between serial data and parallel data interfaces. Often, SerDes are used to provide high-speed data transmission over a wireline channel, such as a single line or a differential pair, to minimize the number of Input/Output (I/O) pins and interconnects.

SerDes receivers require samplers to recover the data that was transmitted. A sampler may have a voltage offset due to manufacturing tolerances and layout impairments. This offset may detrimentally affect the accuracy of the sampler operation in signal recovery. To account for the sampler offset, a calibration process is typically performed during the start-up phase of a wireline system, which generally requires the receiver to be disconnected from the rest of the circuit. Once the sampler offset has been calibrated, the system operates with the calibrated offset without the possibility of modifying the offset during operation of the receiver.

However, dynamic changes in operating environment during operation of the receiver, for example temperature variation and supply voltage fluctuation among others, may cause variations, or a drift, in the sampler offset. With the calibrated offset determined from the initial start-up calibration, the system is unable to dynamically respond to the offset variation during receiver operations. The variation in sampler offset caused by temperature variation may cause significant error in signal recovery that may result in failed transmissions.

Accordingly, it would be useful to provide methods and systems for calibration of sampler offset during operation of the receiver.

SUMMARY

In various examples described herein, methods and apparatus are disclosed that provide calibration of receiver sampler voltage offset. Specifically, a continuous sampler calibration during receiver operation is described, which enables continuous sampler offset adjustment without disabling the receiver.

In the described example embodiments herein, duplicating the operating conditions of the data recovery sampler subjected to voltage drift in a second sampler, such as by setting identical sampling threshold and sampling interval between the two samplers. The voltage offset of the data recovery sampler is varied in one voltage direction (i.e. increasing or decreasing the voltage) until an error rate between the first sampler and the second sampler reach a threshold error value. The voltage offset of the first sampler is then varied in an opposite voltage direction until the error rate between the samplers output again reach the threshold error value. The two voltage offset values corresponding to the threshold error value in each voltage direction define boundary voltage offset values. Once the two boundary threshold voltage offset values are established, the voltage offset of the first sampler is adjusted to be a value between the two threshold offset values, such as an average value of the boundary threshold voltage offset values.

In some examples, the variation of the first sampler offset voltage introduces error into the signal recovery operation of the receiver such that the error rate as measured by bit error rate (BER) is below a forward error correction (FEC) limit of the receiver.

In some aspects, the present disclosure describes a system for calibrating sampler voltage offset drift, the system comprising: a receiver configured to receive a received signal, the receiver including a first data sampler having a first voltage offset and a second data sampler having a second voltage offset, the first and second data samplers configured to sample the received signal; a calibration module configured to: match an initial operating condition of the first sampler with the second sampler; adjust the first voltage offset in a first voltage direction until an error rate between a first output of the first sampler and a second output of the second sampler meets a first threshold error value at a first threshold voltage offset value; adjust the first voltage offset in a second voltage direction, opposite of the first voltage direction, until the error rate between the first output of the first sampler and the second output of the second sampler meets a second threshold error value at a second threshold voltage offset value; set the first voltage offset to a value between the first threshold voltage offset value and the second threshold voltage offset value.

In any of the above aspects, the system may be a wireline electronic system.

In any of the above aspects, the receiver may be a serializer/deserializer (SerDes) receiver.

In any of the above aspects, the system may be configured to calibrate the voltage offset drift during mission mode of the receiver.

In any of the above aspects, the voltage drift may be caused by dynamic changes in the system including a temperature drift.

Any of the above aspects may further comprise a forward error correction (FEC) module in communication with the SerDes receiver, wherein the first threshold error value and the second threshold error value are below a FEC limit of the FEC module.

In any of the above aspects, the first threshold error value and the second threshold error value may be identical.

In any of the above aspects, the calibration module may be further configured to adjust the first voltage offset to be an average value of the first threshold voltage offset value and the second threshold voltage offset value.

In any of the above aspects, the first sampler may be a data recovery sampler.

In any of the above aspects, the second sampler may be an eye monitor sampler.

In any of the above aspects, the calibration module may be configured to match the operating conditions by adjusting the second voltage offset until a sampling threshold of the second sampler is similar to a sampling threshold of the first sampler.

In some further aspects, the present disclosure describes a method of calibrating sampler voltage offset drift in a receiver, comprising: matching an initial operating condition of a first sampler with a second sampler of the receiver; adjusting a first voltage offset of a first data sampler in a first voltage direction until an error rate between a first output of the first data sampler and a second output of a second data sampler meets a first threshold error value at a first threshold voltage offset value; adjusting the first voltage offset in a second voltage direction, opposite of the first voltage direction, until the error rate between the first output of the first data sampler and the second output of the second data sampler meets a second threshold error value at a second threshold voltage offset value; setting the first voltage offset to a value between the first threshold voltage offset value and the second threshold voltage offset value.

In any of the above aspects, the calibrating may be performed during mission mode of the receiver.

Any of the above aspects may further comprise applying forward error correction (FEC) by a FEC module to the first output of the first sampler.

In any of the above aspects, the first threshold error value and the second threshold error value may be less than or equal to a FEC limit of the FEC module.

In any of the above aspects, the setting may further comprise adjusting the first voltage offset to be an average value of the first threshold voltage offset value and the second threshold voltage offset value.

In any of the above aspects, the calibrating may be performed continuously during mission mode of the receiver.

In any of the above aspects, the calibrating may be performed when a system operating temperature is changed by a temperature interval.

In any of the above aspects, the calibrating may be performed at fixed or variable time intervals.

In any of the above aspects, the matching may further comprise adjusting the second voltage offset until a sampling threshold of the second sampler is similar to a sampling threshold of the first sampler.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

In examples disclosed herein, methods and systems are described for calibration of offset voltage drift in a receiver sampler. To assist in understanding the present disclosure, FIG. 1 is first described.

Figure 1:
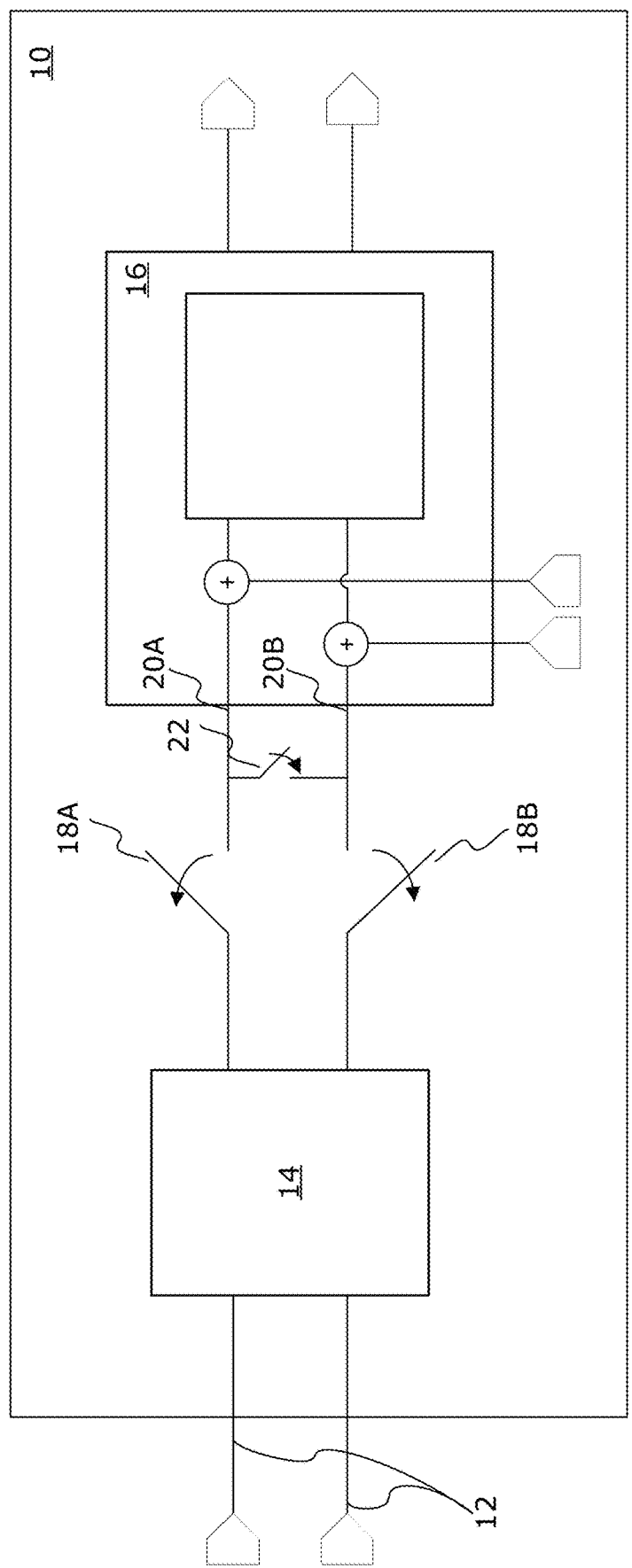
FIG. 1 illustrates a simplified block diagram of a conventional receiver sampler during calibration.
Figure 2:
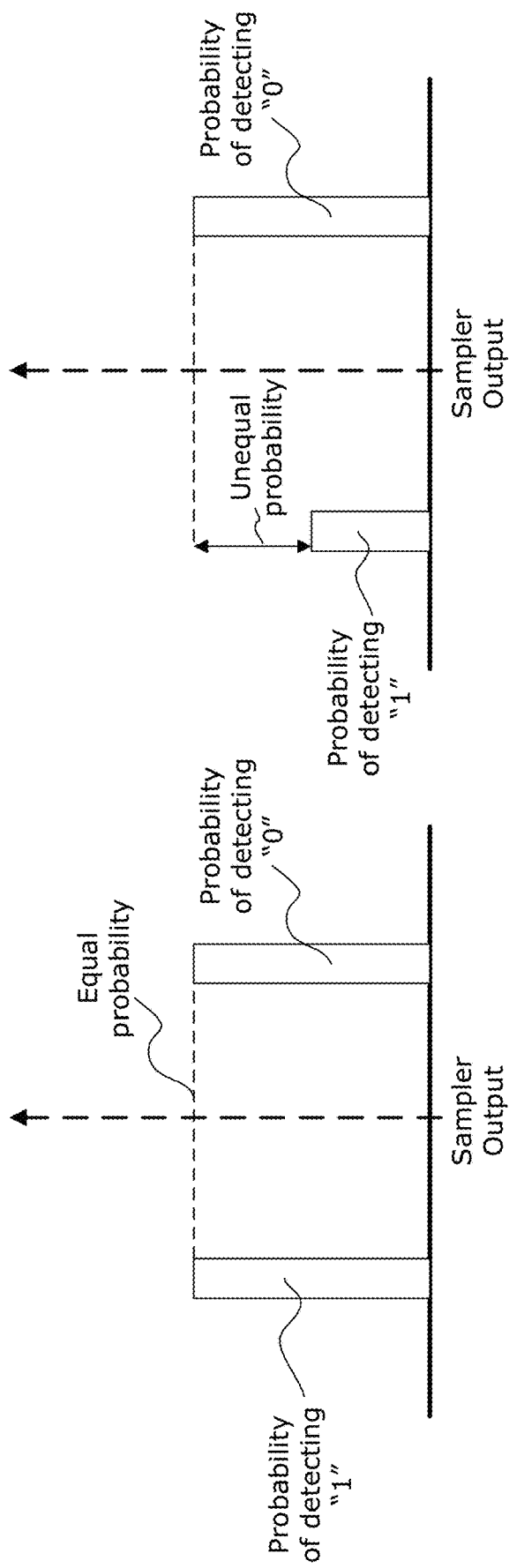
FIG. 2A is an example histogram illustrating the data detection probabilities by a sampler with shorted inputs (the sampler input voltage is equal to the sampling threshold) exhibiting no voltage offset drift.
FIG. 2B is a simplified histogram illustrating the data detection probabilities by a sampler with shorted inputs (the sampler input voltage is equal to the sampling threshold) with voltage offset drift.

FIG. 1 illustrates a simplified block diagram of conventional receiver sampler during calibration. As shown, signals are transmitted to a receiver 10 over a differential pair wireline communication channel 12. The receiver 10 may be a SerDes receiver. Conventionally, in order to perform the sampler calibration, sampler 16 is disconnected from the front end portion 14 of receiver 10 by opening connection switches 18A and 18B. Once the sampler is disconnected from the front end portion 14, the two input terminals 20A and 20B of the sampler 16, which are configured to receive differential signals, are tied together by closing connection switch 22. Typically when one of the input terminals, for example 20A, has a higher voltage than that of 20B, the sampler may detect a signal "1", and vice versa when the voltage at input terminal 20B is higher than that of terminal 20A, the sampler detects a signal "0". With the two input terminals 20 tied together, two input terminals 20A and 20B should have no voltage difference in between them. Then statistically, the sampler should have equal probabilities of detecting "1" and detecting a "0" as shown in FIG. 2A. However, with a sampler offset, the probability of detecting either a "1" or a "0" is skewed in favor of one detection as shown in FIG. 2B. Thus, during calibration, an offset voltage is applied to the sampler until the skewed detection probability as shown in FIG. 2B is adjusted to that of a balanced detection probability as shown in FIG. 2A. Once the calibrated offset voltage has been determined, the sampler is reconnected to the front end portion 14 to commence receiver operation in mission mode. Since the conventional sampler calibration requires the sampler to be disconnected from the rest of the circuit, it can only be performed during startup of the system when error rate or failed communications are inconsequential. However, once the sampler enters into mission mode, calibration is no longer feasible as it would cause transmission failure.

Figure 3:
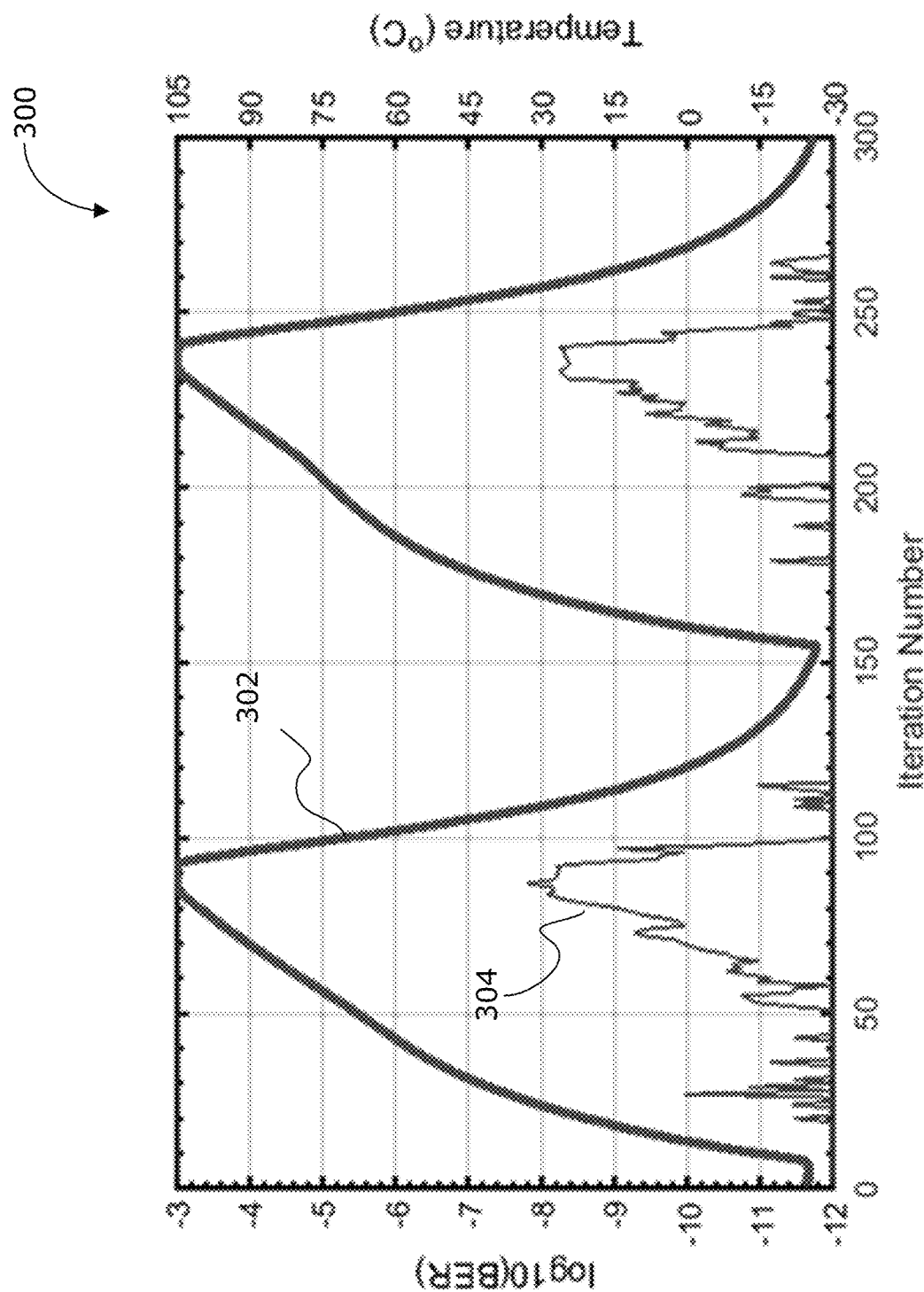
FIG. 3 is a plot illustrating the impact of temperature drift on system performance.

FIG. 3 illustrates a plot 300 showing impact of temperature drift on system performance. As shown in the FIG. 3, the sampler has a starting temperature of −25° C., which is also the temperature at which the initial calibrated offset was determined as described above with respect to FIG. 1. As time, in terms of iteration numbers, progresses, the operating temperature of the sampler, as indicated by plot 302, fluctuates between 105° C. and −25° C. The fluctuation in system performance, as measured by BER illustrated by plot 304, appears to correlate with that of temperature variation. As the operating temperature increases, the system performance degrades with higher BER. The cause of the system performance degradation can be traced to drift of the sampler offset as the result of varying operating temperature. This phenomenon is commonly referred to in the art as temperature drift.

Figure 4:
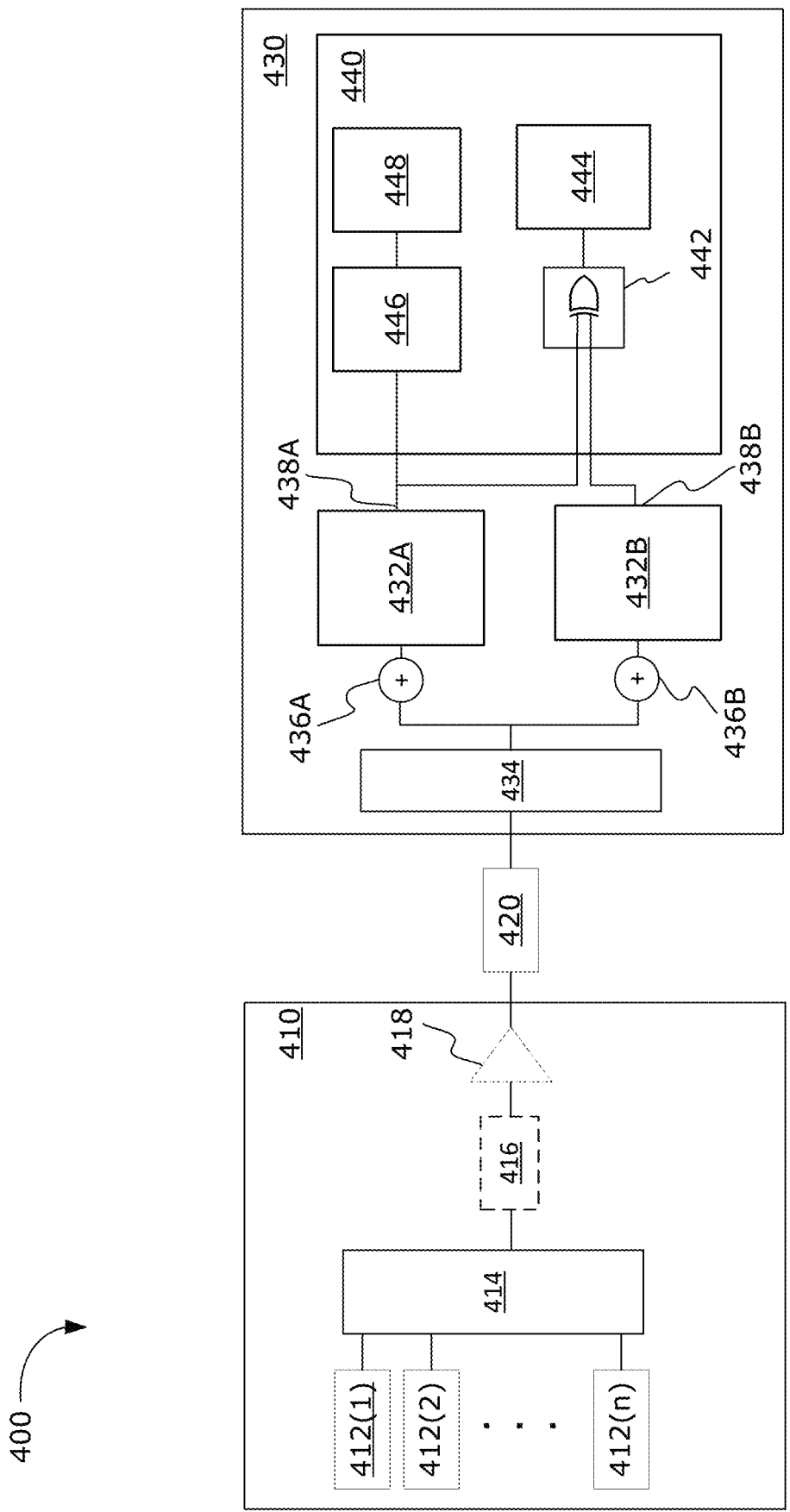
FIG. 4 illustrates a simplified block diagram of an example data communication system having a receiver in accordance with an example embodiment of the present disclosure.

FIG. 4 illustrates a simplified block diagram of an example data communication system 400 utilizing a SerDes transmitter 410 to transmit a signal over a communication channel 420 to a SerDes receiver 430 in accordance with exemplary embodiments of the present disclosure. The data communication system 400 may be a telecommunications system, such as a base station, a relay station, a scheduler, a controller, a gateway, a router, an applications server, or any other device in the data communications system. In other embodiments, the system 400 is in a user-side device, such as a mobile station, a user equipment (UE), a personal computer (PC), a tablet, a wearable communications device (e.g., a smartwatch, etc.), or any other device adapted to communicate data.

The SerDes transmitter 410 is configured to transmit parallel data streams 412(1)-412(n) (generically referred to as data streams 412), through the communication channel 420, to one or more SerDes receivers 430. Each data stream 412 may include signals that are defined by a sequence of regular units in time domain. The unit may be a frame, a symbol, a sub-frame or multiple frames of the signal, for example. In the illustrated embodiment, the SerDes transmitter 410 includes a Parallel In Serial Out (PISO) converter 414 configured to convert parallel data streams 412 into a single data stream for transmission. The PISO converter 414 may be a parallel-in serial-out shift register or any other suitable circuit implementation. When the clock frequencies used within system 400 are slower than the transmission rate on over channel 420, multiple parallel data streams 412 may be serially shifted out of the PISO converter 414 to create a high speed serial data stream. The illustrated SerDes transmitter 410 further includes an optional correction module 416 to counteract signal impairments, such as inter-symbol interference (ISI) and channel noise from channel 420. The correction module 416 may include one or more finite impulse response (FIR) filters or any other suitable implementation. The SerDes 410 may further include an optional amplifier 418 to amplify the serialized data stream after equalization.

The communication channel 420 may be a wireline channel, including but not limited to cables, bond wires, PCB traces, package pins along with any suitable wireline channels. Alternatively, the communication channel may be a wireless channel, including but not limited to 4G LTE, 3G and 2G wireless services, wireless local area network (WLAN) channels, short-range wireless channels, such as Bluetooth®, and any other suitable wireless channels. The communication channel 420 may introduce various signal impairments to the transmitted signal.

In the illustrated embodiment, the SerDes receiver 430 includes two samplers 432A and 432B (collectively referred to as samplers 432) configured to sample the received signal. Samplers 432A and 432B include respective voltage offsets 436A and 436B, which may be used to apply an offset compensation voltage to samplers 432A and 432B, respectively. The transmitted signal may first be received by a front portion 434 of the receiver prior to sampling. The front portion 434 may include one or more equalizers (not shown) for removing ISI and/or channel noise impairments. By way of non-limiting example, the equalizers in the front portion 434 may be implemented as a high-pass function in the form of a FFE (Feed-Forward Equalizer). The front portion 434 may also include variable gain amplifiers (VGA's) or a continuous-time linear equalizer (CTLE) (not shown) among other circuit elements.

The samplers 432 are configured to convert the received signal in analog form back into a digital serial stream of 1's and 0's. In some embodiments, the sampler 432A may be a data recovery sampler used for recovering the transmitted data, and sampler 432B may be an eye monitor sampler configured for determining data eye statistics of sampler 432A.

Figure 5:
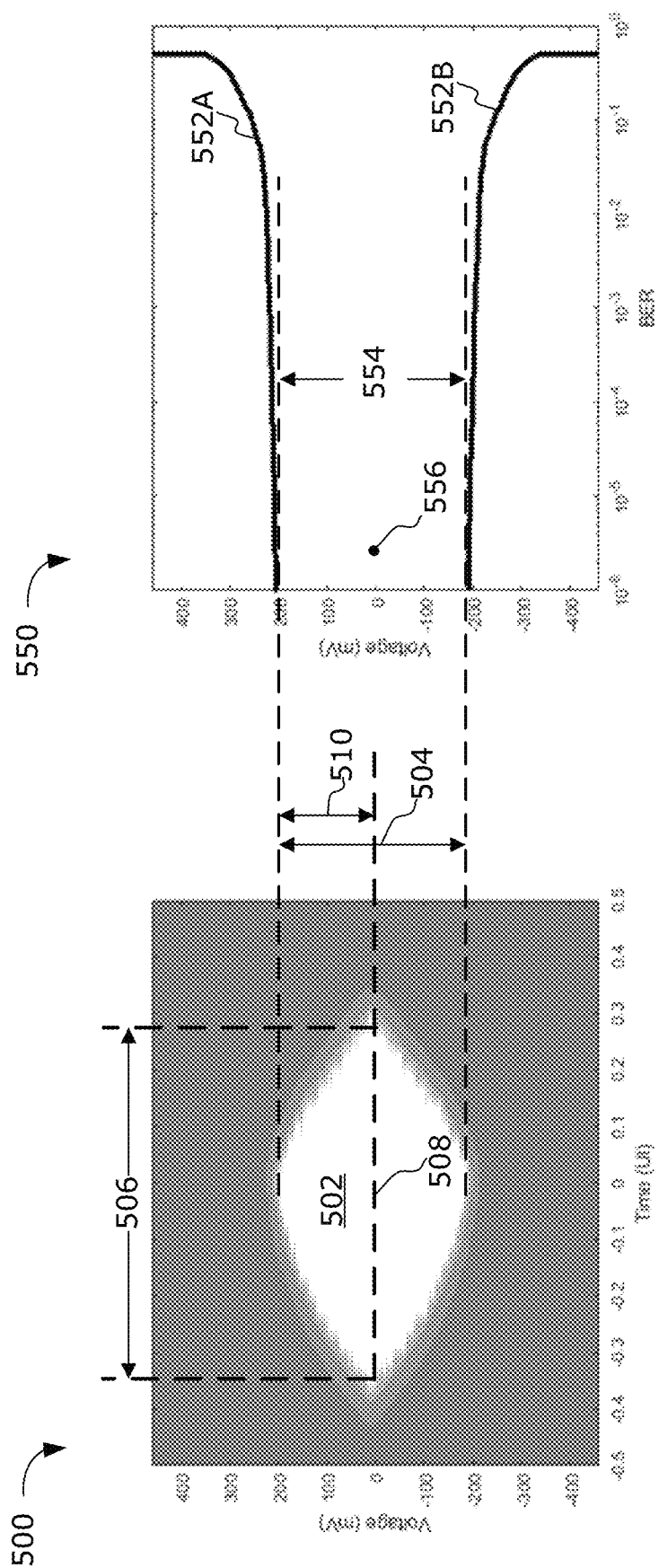
FIG. 5A illustrates an exemplary eye diagram that may be generated by one of the samplers in FIG. 4.
FIG. 5B illustrates the bathtub curve of the eye diagram in FIG. 5A.

Conventionally, an eye monitor sampler is configured to monitor data eye characteristics of the signal in a data stream. The eye monitor sampler generates data eye statistics by varying a voltage offset to the eye monitor sampler and comparing the sampler output to that of the data recovering sampler such as 432A. The eye statistics of a sampler may be composed into an eye pattern or eye diagram. Eye diagrams include multiple signals comprised of data bits that are triggered by a clock. Signals are superimposed on top of one another which show an envelope of amplitude and timing fluctuations. In other words, an eye diagram provides indications of a range of amplitude and timing deviations associated with data bits. FIG. 5A shows an eye diagram 500 that may be generated from samplers 432A and 432B. As shown, the received analog waveforms are superimposed on top of one another based on a common time interval (i.e. the period of the waveform). As may be observed, the overlapping waveforms form an eye shaped opening 502. The eye opening 502 is defined by a vertical eye opening 504 and a horizontal eye opening 506. Generally, a wider eye opening 502, as defined by eye openings 504 and 506, is indicative of a channel with decreased channel noise. As the amount of signal interference from channel noise, among other sources, increases, the eye opening 502 becomes smaller. Samplers, such samplers 432A and 432B, have a sampling threshold that is ideally located at the middle of the eye opening 502, as indicated by middle line 508. Any signal sampled above the sampling threshold is taken to be a signal "1" while anything sampled below the sampling threshold is taken to be a "0", thus, converting the received analog waveform into a digital data stream. By sampling the received signal at middle line 508, system margin 510, as defined by the voltage amplitude between the middle line 508 and the upper or lower bound of the vertical eye opening 504, may be maximized. A maximized system margin 510 allows the most amount of voltage variation (or noise) in the received signal and yet still make the correct sampling prediction. As the operating temperature increases during receiver operation, the sampling threshold of the sampler drifts above or below the middle line 508, which can cause incorrect signal prediction. For example, when the sampling threshold shifts up into the upper half of the eye opening 502, a signal having a voltage amplitude above the middle line 508 and below the sampling threshold may be interpreted as a "0", when it should have been interpreted as a "1".

FIG. 5B illustrates a plot 550 of a bit error rate tester (BERT) scan, also referred to as a bathtub curve, of the sampler that generated the eye diagram in FIG. 5A. Typically, a bathtub curve of a sampler may be generated by sweeping the voltage offset of an eye monitor sampler such as sampler 432B, and its output is compared against that of a data sampler, such as sampler 432A, to generate BER values plotted as shown in FIG. 5B having portions 552A and 552B. It is understood that although it appear that portions 552A and 552B are disjointed, they are connected for voltage amplitude range that result in a BER of 0. In a bathtub curve plot, such as shown in FIG. 5B, the least vertical distance between portions 552A and 552B (referred to as base width 554) is indicative of the size of the vertical opening 504 of the eye opening 502. Thus, a channel with increased channel noise results in a narrower base width 554, and vice versa, a channel with less channel noise provides a wider base width 554. Ideally, the sampling threshold, as denoted by 556, is located in the middle of the base width 554 as this would provide maximum voltage margin in both directions. Ideally, the start-up phase calibration would place the sampling level at the middle of the base width 554. As temperature drift occurs during receiver operation, the sampling level 556 will drift up or down, and follow either the portion 552A or 552B of plot 550 as system BER increases.

Referring back to FIG. 4, the outputs 438A and 438B of respective samplers 432A and 432B are provided to a receiver logic block 440 configured to process and operate on sampled data. In the illustrated embodiment, the receiver logic 440 includes a comparator 442, calibration module 444, Serial-In Parallel-Out (SIPO) converter 446, and a forward error correction (FEC) module 448. It should be understood that the comparator 442, calibration module 444, SIPO converter 446, and FEC module 448 are not necessarily separate units of the receiver 430, and that the illustration of these in FIG. 4 as separate blocks within the receiver 430 may only be a conceptual representation of the overall operation of the receiver 430. For example, comparator 442 may be implemented as part of calibration module 444. Further, although SIPO converter 446 and FEC module 448 are shown to be part of the receiver logic block 440, they may be partially or fully located in components outside of receiver 430 in some embodiments.

As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, an application specific integrated circuit (ASIC), field programmable gate array (FPGA), or a system on a chip (SoC) or another hardware processing circuit.

The comparator 442 configured to compare the outputs 432A and 432B is described in more detail below. As shown, the comparator 442 is implemented in the form of an exclusive OR (XOR) gate, which is able to detect when outputs 432A and 432B differ from one another as described in more detail below. It is understood that other suitable implementations of the comparator 442 may be possible.

The SIPO converter 446 is configured to convert the high-speed sampled data stream of 1's and 0's back to a multiple parallel data streams. The FEC module 448 configured to apply error correction on the parallel data streams. The FEC module 448 may implement any suitable FEC scheme, including but not limited to any one of Reed Solomon FEC (RSFEC), Enhanced FEC (EFEC), Bose-Chaudhuri-Hocquenghem (BCH), and/or Ultra FEC (UFEC) schemes. FEC typically requires insertion of additional redundant data bits into the transmitted data stream. Hence, stronger FEC tend to require more redundancy and thereby reducing the effective data rate of the transmission, and vice versa, less redundancy coding may result in higher bit rate at the cost of higher BER. Accordingly, FEC module 448 is associated with a FEC threshold (or FEC limit), which is defined as the pre-FEC BER required to achieve a certain post-FEC BER.

The calibration module 444 is configured to determine a sampler offset of the data recovery sampler 432A and adjust the voltage offset 436A to calibrate sampler 432A. In some embodiments, the calibration module 444 configures the sampler 432B (i.e. the eye monitor sampler) to mirror the operating conditions, including sampling threshold, of voltage output 438A of sampler 432A at the start of the calibration process. The sampler 432A may be subject to temperature drift during receiver operation, and may not be operating with the ideal sampling level as described above despite the voltage offset by 436A. By adjusting the voltage offset 436B, the sampling threshold of sampler 432B is made to match the sampling threshold of the data recovery sampler 432A.

Figure 6:
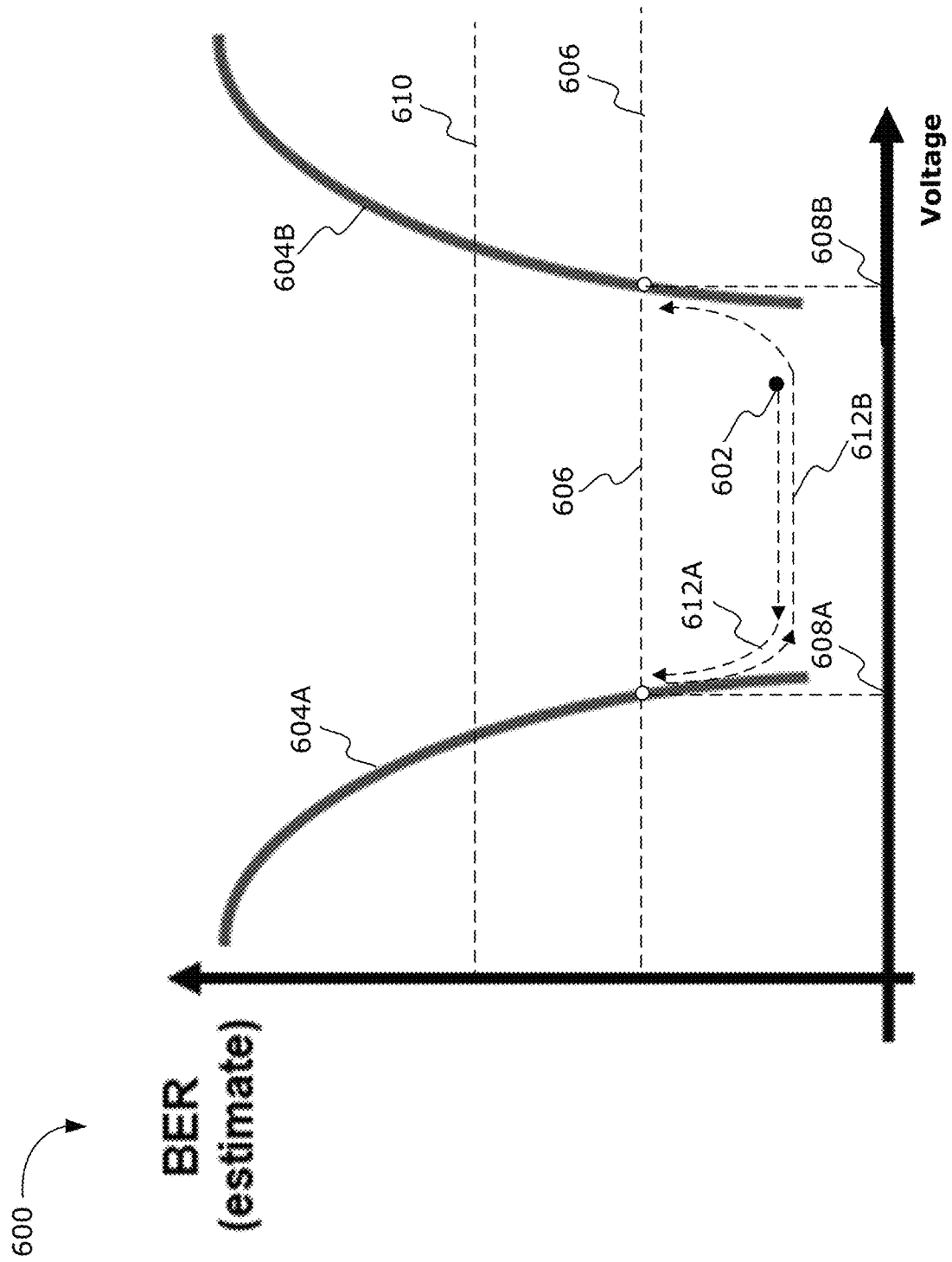
FIG. 6 is a bathtub curve illustrating the voltage offset calibration in accordance with an example embodiment of the present disclosure.

The calibration module 444 is further configured to sweep the voltage value of the voltage offset 436A of the data recovery sampler 432A by continually increasing or decreasing the voltage offset 436A. FIG. 6 shows a hypothetical bathtub curve of a sampler 432A to illustrate the voltage offset calibration operations of the calibration module 444. As shown, the initial calibrated voltage offset 602, indicative of the sampling level of a sampler 432A after the initial calibration, is shifted from its ideal position at the middle of the bathtub curve base due at least in part to temperature drift. Although calibrated voltage offset 602 is shown as drifted towards right portion 604B of the plot, it is understood that the offset 602 can be drifted in the other direction towards the left portion 604A of the plot as well. As the voltage offset 436A is varied from the initial calibrated voltage offset 602, the sampling level of the sampler 432A is also varied in response, resulting in increased discrepancy between the output 438A of sampler 432A and output 438B of sampler 432B. The difference between the two samplers produces increased BER that follows the bathtub curve 600. For example, gradual increase in voltage offset may cause the BER to increase along the right portion 604B of bathtub curve 600, and vice versa, continued voltage offset decrease may cause the BER to follow the left portion 604A of the bathtub curve 600.

The voltage offset 602 is continually varied in one direction (i.e. by continually increasing or decreasing the voltage offset value) until the corresponding BER meets a BER threshold value 606. The voltage offset values 608A and 608B denote the voltage offset value that results in a BER that meets the BER threshold 606 on the left portion 604A and right portion 604B of the plot, respectively. Intuitively, the BER threshold value 606 may be met by both increasing and decreasing the sampling level by increasing and decreasing the voltage offset 436A from the initial value of the calibrated voltage offset 602.

The BER threshold 606 may be determined based on system requirement or design specification or any other suitable criteria. In some embodiments, the BER threshold value 606 is set as a BER value that is less than a FEC limit 610 of the FEC module 448. The variation in sampling level of the data recovery sampler 432A from voltage offset sweep introduces additional errors into the sampler output as reflected by the increased BER. Thus, by keeping the BER threshold value 606 below the FEC limit 610, the impact of the error introduced by the sampler calibration may be minimized by the error correction performed by FEC module 448.

In some embodiments, the calibration module 444 is configured to first vary the voltage offset 436A from its initial value of 602 in one direction of the bathtub curve 600, such as direction 612A along left portion 604A of the curve 600. Upon the BER meeting the BER threshold 606 on the left portion 604A, the calibration module 444 records the corresponding voltage offset value 608A, such as by storing the value in memory, and varies the voltage offset 436A in the opposite direction as shown by dashed line 612B towards, and along, the right portion 604B of the bathtub curve 600. The voltage offset 436A is continually varied in the opposite direction until the BER meets the BER threshold 606 again, and the corresponding voltage offset value 608B is recorded. Although FIG. 6 shows voltage offset variation towards left portion 604A first then back towards right portion 604B, it is understood that the direction of voltage offset variation may be reversed.

Once both threshold voltage values 608A and 608B, also referred to as boundary voltage offset values, are obtained, the calibration module 444 is configured to adjust the voltage offset 436A to a value in between the two boundary voltage offset values 608A and 608B. In some embodiments, the calibration module 444 is configured to determine a middle value between the two boundary voltage offset values 608A, 608B, and adjusts the voltage offset 436A to the middle value as the calibrated voltage offset value to provide maximum error margin. Advantageously, the data sampler 432A is functional during the calibration process, which allows the calibration to occur during operation of the receiver.

There exists a direct tradeoff between the threshold BER 606 and the run time of the calibration process. For example, in embodiments where the BER threshold 606 is relatively high (i.e. closer to the FEC limit 610), the temporary BER degradation may be more pronounced. However, the increased BER allows the BER threshold 606 to be determined relatively quickly. In turn, the corresponding boundary voltage offset values 608A and 608B may be determined within shorter run time, allowing the calibration process to complete more quickly. For embodiments where the BER threshold 606 is relatively low (i.e. further away from the FEC limit 610), the BER degradation may be less, but given less errors are generated, it may take longer run time to reach BER threshold 606 and determine the corresponding boundary voltage offset values 608A, 608B, leading to a lengthier calibration process.

Figure 7A:
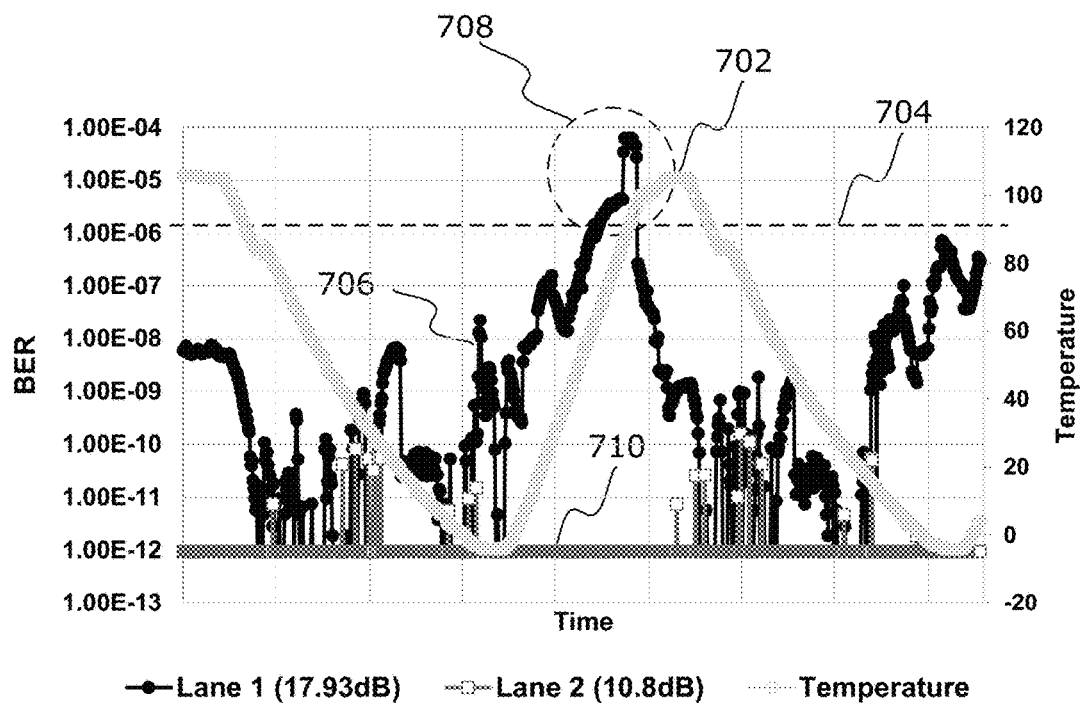
FIG. 7A is a plot illustrating system performance without voltage offset calibration.
Figure 7B:
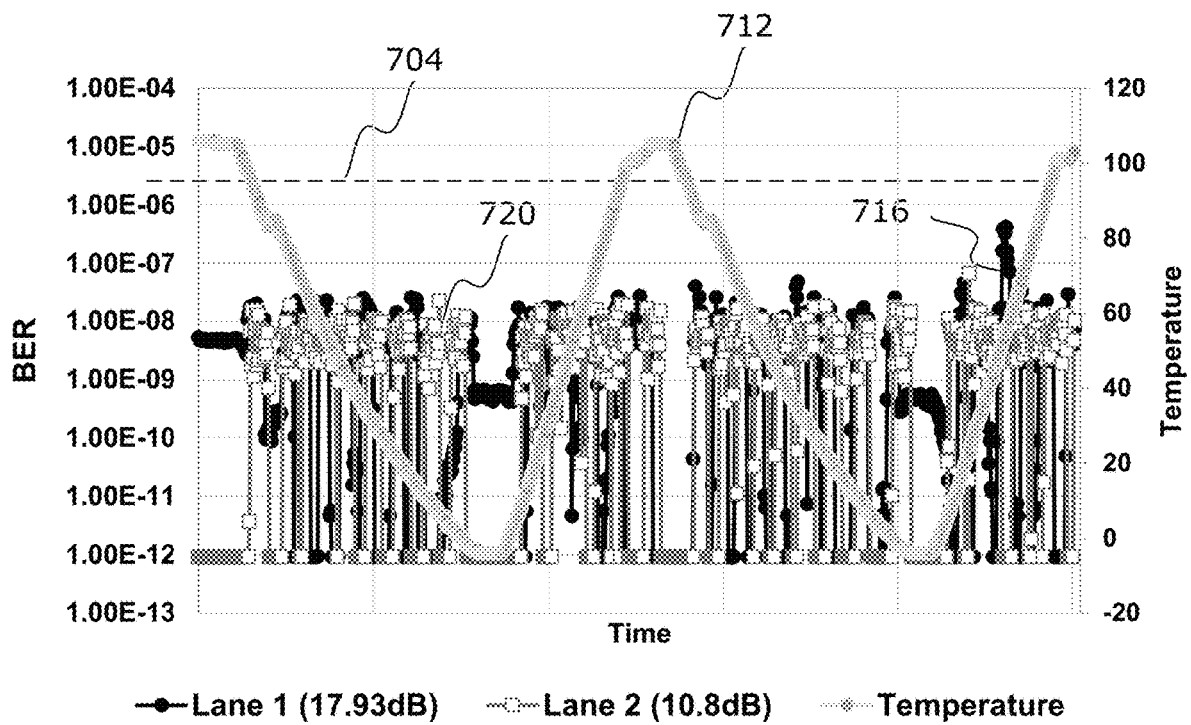
FIG. 7B is a plot illustrating system performance having applied the voltage offset calibration in accordance with an example embodiment of the present disclosure.

During the calibration process described herein, more consistent system performance with respect to sampler calibration may be achieved at the cost of an increase in average BER. In some embodiments, the average BER of the system may be higher because of the sampling threshold variations. However, errors introduced by the calibration process may be correctable through FEC. FIGS. 7A and 7B illustrate the performance impact of the calibration processed described herein. FIG. 7A illustrates system performance (as measured by BER) in response to temperature drift without use of the calibration process described herein. The operating temperature of the receiver over time is shown in plot 702. The design specification dictates a receiver BER limit 704 of $1 \times 10^{-06}$ as denoted by the dashed line. The performance (as measured by BER) of a first channel, Lane 1 characterized with a loss of 17.93 decibel (dB) is shown in plot 706. Notably, Lane 1 has less margin with respect to the BER limit 704, and as temperature exceeds 60, the channel communication starts to fail at 708 with BER exceeding the system limit 704. In contrast, the second channel Lane 2, characterized with a loss of 10.8 dB, has considerably more margin and does not fail for any operating temperature as shown by plot 710. FIG. 7B illustrates the system performance (as measured by BER) of the same receiver chip that generated FIG. 7A in response to temperature drift having applied the calibration process described herein. As may be observed from FIG. 7B, both channels now exhibit similar BER performance as shown by plots 716 and 720 for a similar operating temperature plot 712. The BER plot 716 of channel Lane 1 is now more consistent in value compared to that of 706 in FIG. 7A. More importantly, there are no failed communication packets as the BER of channel Lane 1 is below the required BER limit 704. For channel Lane 2, its BER, as shown by plot 720, is now elevated compared to 710 of FIG. 7A and is now similar to that of channel Lane 1. Thus, rather than one channel failing some of the time as shown in FIG. 7A, the sampler calibration process described herein was able to correct for the sampler voltage offset drift during operation of the receiver and allow both channels Lane 1 and Lane 2 to meet the BER requirement.

In some embodiments, the calibration process described herein may be performed continuously during operation of the receiver. In some other embodiments, the calibration process described herein may be performed intermittently between fixed or variable time intervals. In some further embodiments, the calibration may be performed based on changes in operating temperature. For example, the calibration process may be initiated for every 10-degree change in operating temperature. Other methods for invoking the calibration process described herein may be adopted. For example, the calibration process described herein may be performed as the initial calibration during start up phase of the receiver.

Figure 8:
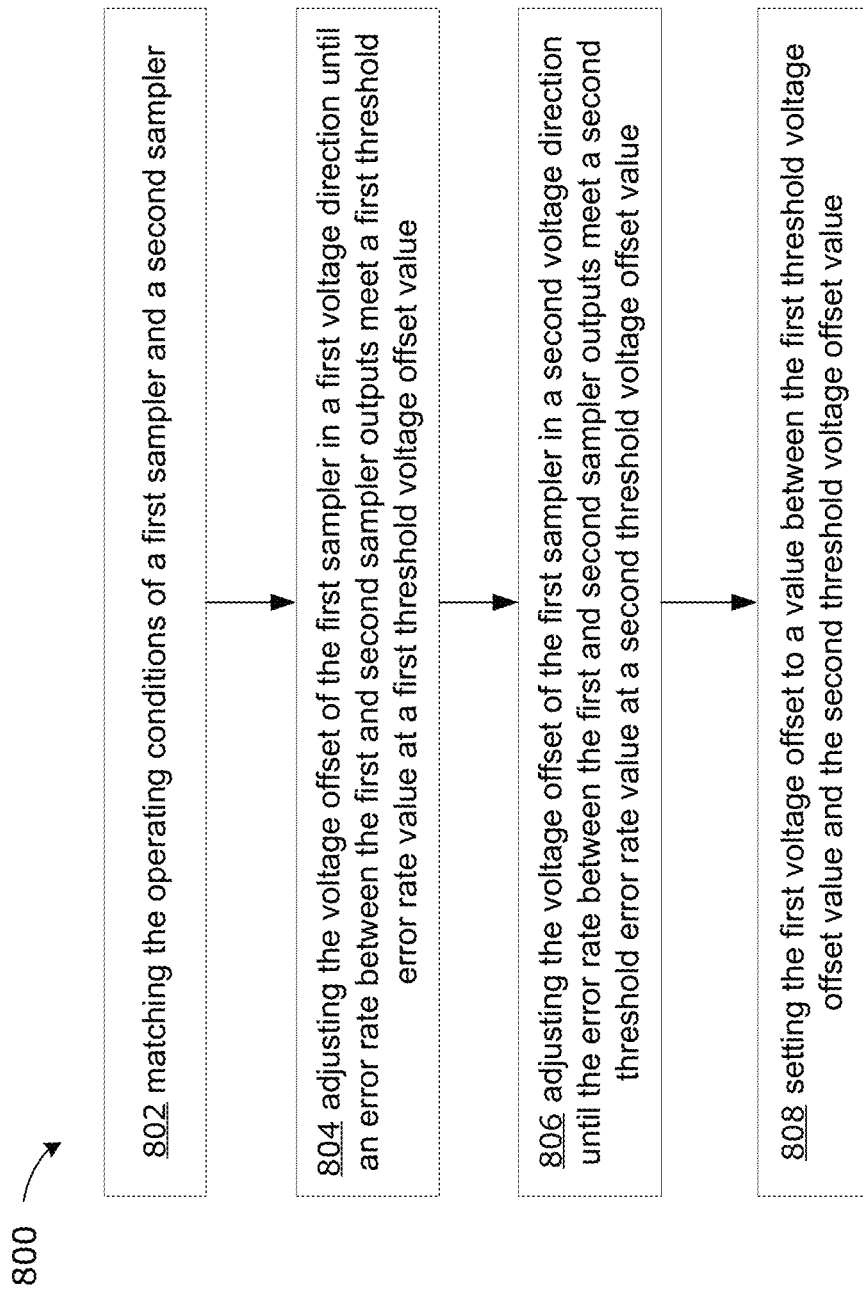
FIG. 8 a flowchart illustrating an example method of sampler voltage offset calibration performed by the calibration module in accordance with an example embodiment of the present disclosure.

FIG. 8 is a flowchart illustrating an example method 800 of sampler voltage offset calibration performed by the calibration module 444 in accordance with an example embodiment.

At 802, the calibration module 444 is configured to match the operating condition of a first sampler (i.e. a data recovery sampler) with that of another sampler (i.e. an eye monitor sampler). The matching includes adjusting the voltage offset of the second sampler until the sampling threshold of the second sampler is identical to the sampling threshold of the first sampler.

At 804, the calibration module 444 adjusts the voltage offset of the first sampler in a first voltage direction until an error rate, for example the BER, between the outputs of the first and second samplers meets a first threshold error rate value at a first threshold voltage offset value. The adjustment may include continually increasing or continually decreasing the voltage value of the voltage offset.

At 806, the calibration module 444 adjusts the voltage offset of the first sampler, for example in the opposite voltage direction of the first voltage direction applied to reach the first threshold voltage offset value. For example, if the first voltage direction was increasing the voltage, then the second direction is to decrease the voltage of the voltage offset and vice versa. The voltage offset adjustment is continued until the error rate between the outputs of the first and second samplers meet a second error rate threshold value at a second threshold voltage offset value.

At 808, the calibration module 444 sets the first voltage offset to a value between the first voltage offset value and the second voltage offset value. In some embodiments, the value is a middle value, in other words the average, of the first and second threshold voltage offset values to provide maximum error margin.

Figure 9:
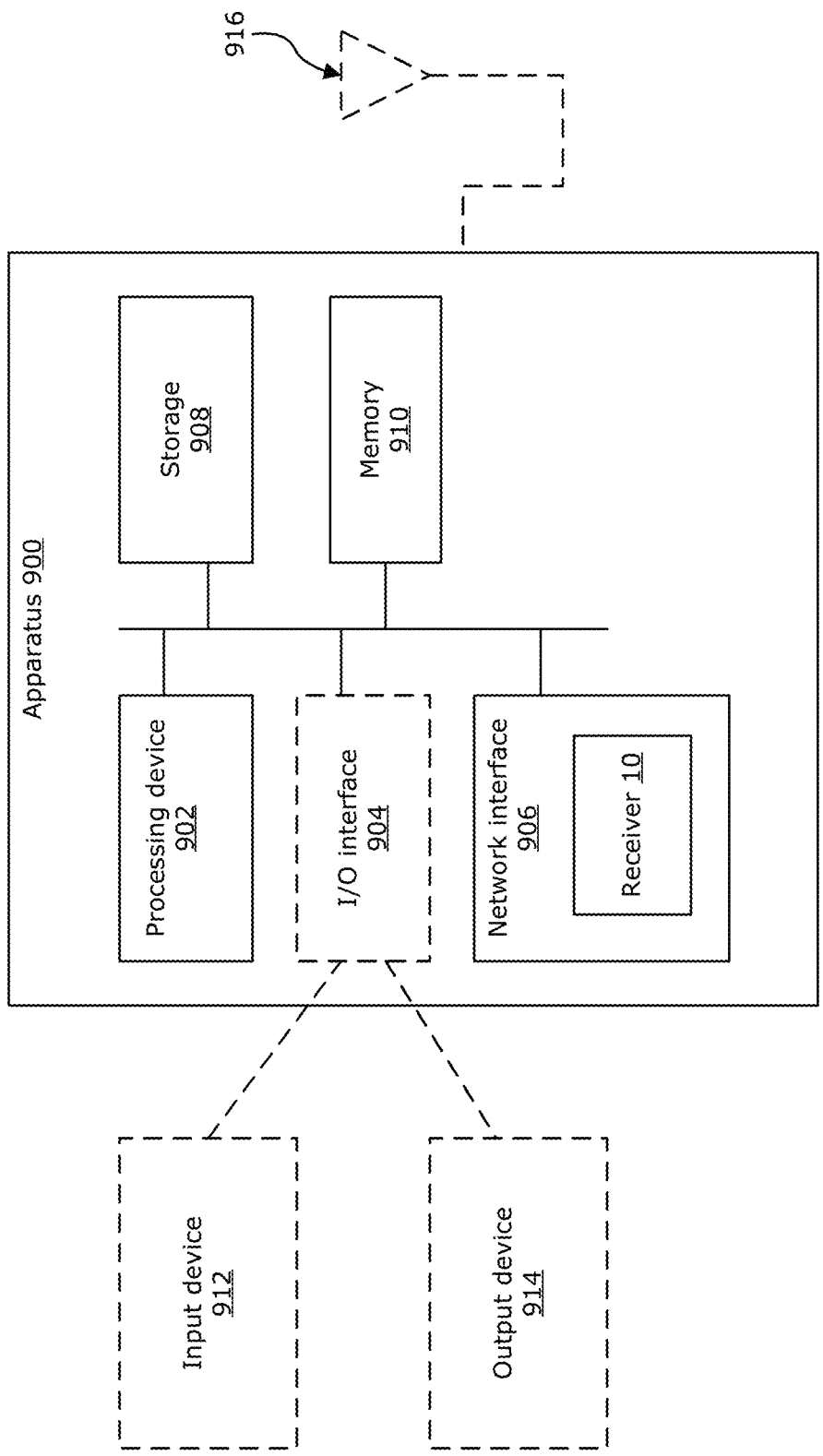
FIG. 9 a simplified block diagram illustrating an example apparatus in which the voltage offset calibration in accordance with an example embodiment of the present disclosure may be implemented.

FIG. 9 is a block diagram illustrating an example apparatus 900 in which the receiver 10 may be implemented. For example, the apparatus 900 may be an electronic device, such as a server, a computing system, an access point (AP), a terminal device, etc. The apparatus 900 is capable of wireline communications, and may optionally also have capabilities for wireless communications. Other communication devices suitable for implementing examples described in the present disclosure may be used, which may include components different from those discussed below. Although FIG. 9 shows a single instance of each component, there may be multiple instances of each component in the apparatus 900 and the apparatus 900 could be implemented using parallel and/or distributed architecture.

In this example, the apparatus 900 includes one or more processing devices 902, such as a processor, a microprocessor, an ASIC, a field-programmable gate array (FPGA), a dedicated logic circuitry, or combinations thereof. The apparatus 900 may also include one or more optional input/output (I/O) interfaces 904, which may enable interfacing with one or more optional input devices 912 and/or output devices 914. The apparatus 900 includes one or more network interfaces 906, including the receiver 10 for receiving an electronic signal. The network interface(s) 906 may additionally include a transmitter (not shown) for transmitting an electronic signal. The receiver 10 and transmitter may be implemented using any suitable wireline transceiver.

Optionally, if the apparatus 900 has capabilities for both wireline and wireless communications, the apparatus 900 may include one or more antennas 916 to enable wireless communication. In this example, one antenna 916 is shown, which may serve for both transmitter and receiver. However, in other examples there may be multiple antennas for transmitting and receiving. In examples where the apparatus 900 does not have capability for wireless communications, the antenna(s) 916 may be omitted.

The apparatus 900 includes one or more storage units 908, which may include a mass storage unit such as a solid state drive, a hard disk drive, a magnetic disk drive and/or an optical disk drive. The apparatus 900 also includes one or more memories 910, which may include a volatile or non-volatile memory (e.g., a flash memory, a random access memory (RAM), and/or a read-only memory (ROM)). The non-transitory memory(ies) 910 (as well as storage 908) may store instructions for execution by the processing device(s) 902. The memory(ies) 910 may include software instructions, such as for implementing the calibration module 444. In some examples, instructions may also be provided by an external memory (e.g., an external drive in wired or wireless communication with the apparatus 900) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Optional input device(s) 912 (e.g., a keyboard, a mouse, a microphone, a touchscreen, and/or a keypad) and optional output device(s) 914 (e.g., a display, a speaker and/or a printer) are shown as external to the apparatus 900, and connected to optional I/O interface 904. In other examples, one or more of the input device(s) 912 and/or the output device(s) 914 may be included as a component of the apparatus 900.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system for calibrating sampler voltage offset drift, the system comprising:
  a serializer/deserializer (SerDes) receiver configured to receive a signal, the SerDes receiver comprising a first data sampler having a first voltage offset, a second data sampler having a second voltage offset, a comparator to detect when a first output of the first data sampler differs from a second output of the second data sampler, and calibration circuitry;
  wherein the first and second data samplers are configured to convert the received signal in analog form into a digital serial stream;
  wherein the calibration circuitry is configured:

cause an initial operating condition of the first data sampler to match the second data sampler, wherein matching the initial operating condition of the first data sampler with the second data sampler comprises adjusting the second voltage offset of the second data sampler until a sampling threshold of the second data sampler matches a sampling threshold of the first data sampler;

adjust the first voltage offset of the first data sampler in a first voltage direction until a bit error rate between the first output of the first data sampler and the second output of the second data sampler meets a first threshold bit error rate value at a first threshold voltage offset value;

adjust the first voltage offset of the first data sampler in a second voltage direction, opposite to the first voltage direction, until the bit error rate between the first output of the first data sampler and the second output of the second data sampler meets a second threshold bit error rate value at a second threshold voltage offset value; and set the first voltage offset to a value between the first threshold voltage offset value and the second threshold voltage offset value;

a Serial-In Parallel-Out (SIPO) converter configured to convert the sampled digital serial stream to multiple parallel data streams; and a forward error correction (FEC) module configured to apply error correction, wherein the first threshold bit error rate value and the second threshold bit error rate value are less than or equal to a FEC limit of the FEC module, wherein the FEC module is configured to apply error correction on the parallel data streams output by the SIPO converter.

2. The system of claim 1, wherein the system is a wireline electronic system.

3. The system of claim 1, wherein the system is configured to calibrate the voltage offset drift during mission mode of the SerDes receiver.

4. The system of claim 1, wherein the voltage drift is caused by dynamic changes in the system including a temperature drift.

5. The system of claim 1, wherein the first threshold bit error rate value and the second threshold bit error rate value are the same.

6. The system of claim 1, wherein the first voltage offset is set to be an average value of the first threshold voltage offset value and the second threshold voltage offset value.

7. The system of claim 1, wherein the first data sampler is a data recovery sampler.

8. The system of claim 1, wherein the second data sampler is an eye monitor sampler.

9. A method of calibrating sampler voltage offset drift, comprising:
providing a serializer/deserializer (SerDes) receiver configured to receive a signal, the SerDes receiver comprising including a first data sampler having a first voltage offset, a second data sampler having a second voltage offset, a comparator to detect when a first output of the first data sampler differs from a second output of the second data sampler, and calibration circuitry, wherein the first and second data samplers are configured to convert the received signal in analog form into a digital serial stream;

causing an initial operating condition of a first data sampler to match a second data sampler of the SerDes receiver, wherein matching the initial operating condition of the first data sampler with the second data sampler comprises adjusting the second voltage offset of the second data sampler until a sampling threshold of the second data sampler matches a sampling threshold of the first data sampler;

adjusting a first voltage offset of a first data sampler in a first voltage direction until a bit error rate between the first output of the first data sampler and the second output of a second data sampler meets a first threshold bit error rate value at a first threshold voltage offset value;

adjusting the first voltage offset of the first data sampler in a second voltage direction, opposite to the first voltage direction, until the error rate between the first output of the first data sampler and the second output of the second data sampler meets a second threshold bit error rate value at a second threshold voltage offset value; and setting the first voltage offset to a value between the first threshold voltage offset value and the second threshold voltage offset value;

converting by a Serial-In Parallel-Out (SIPO) converter the sampled digital serial stream to multiple parallel data streams; and applying forward error correction (FEC) by a FEC module to on the parallel data streams output by the SIPO converter.

10. The method of claim 9, wherein the calibrating is performed during mission mode of the SerDes receiver.

11. The method of claim 9, wherein the first threshold bit error rate value and the second threshold bit error rate value are less than or equal to a FEC limit of the FEC module.

12. The method of claim 9, wherein the setting further comprises setting the first voltage offset to be an average value of the first threshold voltage offset value and the second threshold voltage offset value.

13. The method of claim 9, wherein the calibrating is performed continuously during mission mode of the SerDes receiver.

14. The method of claim 9, wherein the calibrating is performed when a system operating temperature is changed by a temperature interval.

15. The method of claim 9, wherein the calibrating is performed at fixed or variable time intervals.

* * * * *